(No Model.)

H. W. MERRITT.
STOVE GRATE.

No. 317,166. Patented May 5, 1885.

WITNESSES
Samson Hewson
William Edson

INVENTOR
Henry W. Merritt

UNITED STATES PATENT OFFICE.

HENRY W. MERRITT, OF SOMERVILLE, ASSIGNOR TO WILLIAM H. IRELAND, OF BOSTON, MASSACHUSETTS.

STOVE-GRATE.

SPECIFICATION forming part of Letters Patent No. 317,166, dated May 5, 1885.

Application filed September 13, 1884. (No model.)

*To all whom it may concern:*

Be it known that I, HENRY W. MERRITT, a citizen of the United States, residing at Somerville, in the county of Middlesex and State of Massachusetts, have invented a new and useful Improvement in Stove-Grates, of which the following is a specification.

My invention relates to that class of grates of which the cross-bars are movable and the entire grate tips on a longitudinal axis, the object being to so make the grate that it may be operated by a single center rod—that is, a rod which can be turned back and forth through a small angle and agitate the cross-bars, or, if turned about ninety degrees, will tip the entire grate, so as to throw the ashes and clinkers into the ash-pit. I accomplish this object by the mechanism shown in the accompanying drawings, in which—

Figure 1:
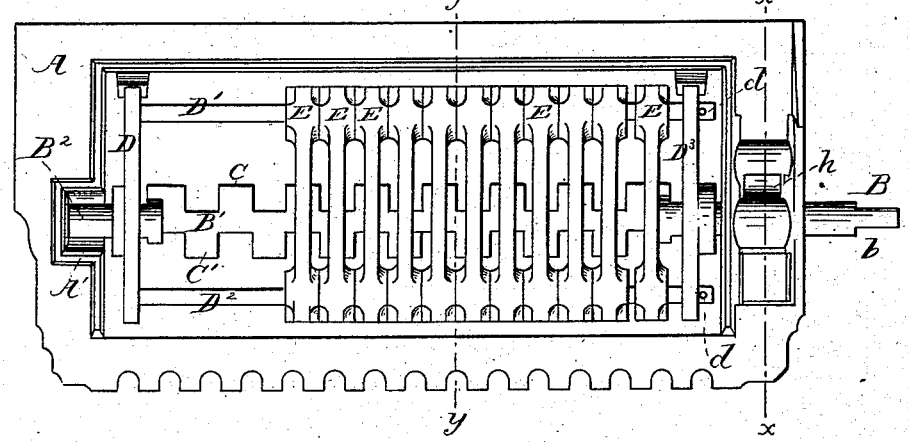
Figure 2:
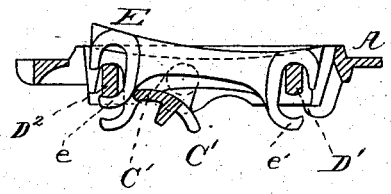
Figure 3:
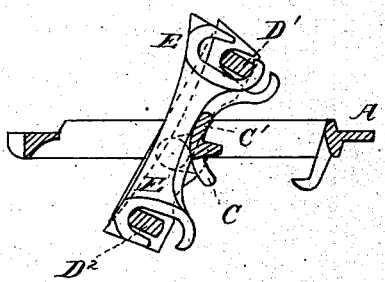
Figure 4:
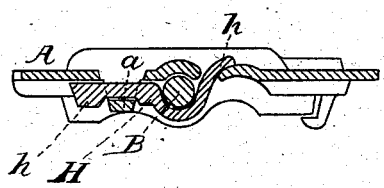

Figure 1 is a plan view showing my invention, a part of the cross-bars being omitted for the purpose of showing the construction of the center or shaking and tipping rod. Fig. 2 is a cross-section taken on line $y\ y$ of Fig. 1, showing by full and dotted lines the positions of the cross-bars to correspond to the position of the tipping-rod. Fig. 3 is a section showing the grate tipped up; and Fig. 4 is a cross-section taken on line $x\ x$ of Fig. 1, and shows the method of connecting the tipping-rod to the bed-plate.

In the drawings, A represents the bed-plate, which may be made of any desired size and form. B' B is a tipping-rod formed with a flatted or square end, $b$, for receiving the shaker, the inner end, $B^2$, being rounded, so as to turn easily in the socket A', formed in end of the bed-plate A.

The rod B B' is provided with cam projections C C', Figs. 1, 2, and 3. These projections are located immediately under the cross-bars E E, and serve to throw up the said bars alternately as the rod B B' is rocked.

The frame D D' $D^2$ $D^3$ is made as shown, and is pivoted on the rod B B', which passes loosely through the end pieces, D $D^3$.

Upon the side bars, D' $D^2$, of the grate-frame I suspend the cross-bars E E loosely—that is, they (the cross-bars) are provided at each end with an opening, $e$, through which the side bars, D' $D^2$, pass.

The operation of my grate is as follows: To shake down the fire, the rod B B' is turned rapidly back and forth. This causes the cam-pieces C C' to throw up and drop the cross-bars E E, and thus thoroughly shake down the fire. To dump the contents of the fire-box, I turn the rod B B' over about ninety degrees. This action throws the grate into the position shown in Fig. 3, so as to throw the ashes into the ash-pit. The end B of the rod B B' is held up by the piece H, Fig. 4, which is made to slip into recesses made in the plate, as shown at $h$ and $a$. The rod B B', Fig. 1, (having a series of projecting cams, C C', one of which is under and operates each alternate bar E E,) is pivoted at its remote end B in the bed-plate A, (see Fig. 1,) while the other end B' is pivoted in the piece H, Fig. 4, which is held in the bed-plate A, as shown in Fig. 4.

I claim—

In a stove-grate, the combination of the bed-plate A and the frame D D' $D^2$ $D^3$, said frame D D' $D^2$ $D^3$ being supported by the rod B B', which has a limited revolving motion in it, with the rod B B', having cam projections C C', and the shaking grate-bars E E, whereby the single rod B B' serves as a support for the frame D D' $D^2$ $D^3$ and as a shaker for the bars E E, also as a means of dumping the grate, all operating together substantially as described, and for the purpose set forth.

HENRY W. MERRITT.

Witnesses:
SAMSON HEWSON,
WILLIAM EDSON.